(12) United States Patent
Hassan et al.

(10) Patent No.: US 9,894,130 B2
(45) Date of Patent: Feb. 13, 2018

(54) VIDEO QUALITY ENHANCEMENT

(71) Applicant: INTEL CORPORATION, Santa Clara, CA (US)

(72) Inventors: Yomna Hassan, Ramlet Beaulac Cairo (EG); Mohamed Rehan, Cairo (EG); Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/494,192

(22) Filed: Sep. 23, 2014

(65) Prior Publication Data

US 2016/0088054 A1    Mar. 24, 2016

(51) Int. Cl.
| | |
|---|---|
| *G06F 15/16* | (2006.01) |
| *H04L 29/06* | (2006.01) |
| *H04N 21/234* | (2011.01) |
| *H04N 21/258* | (2011.01) |
| *H04N 21/262* | (2011.01) |
| *H04N 21/61* | (2011.01) |
| *H04N 21/643* | (2011.01) |

(Continued)

(52) U.S. Cl.
CPC ............ *H04L 65/80* (2013.01); *H04L 65/602* (2013.01); *H04L 65/608* (2013.01); *H04N 21/23418* (2013.01); *H04N 21/25808* (2013.01); *H04N 21/26258* (2013.01); *H04N 21/6131* (2013.01); *H04N 21/64322* (2013.01); *H04N 21/6581* (2013.01); *H04N 21/8456* (2013.01)

(58) Field of Classification Search
CPC ... H04L 65/80; H04L 65/608; H04L 65/4076; H04L 65/60; H04L 65/607; H04L 41/509; H04L 65/605; H04L 65/4084; H04L 65/4092; H04L 29/06027; H04L 41/5009; G06F 17/3002; G06F 19/3418; G06F 11/2294; G06F 17/30864

See application file for complete search history.

(56) References Cited

U.S. PATENT DOCUMENTS

2007/0002946 A1*  1/2007  Bouton .................. H04N 19/15
                                                        375/240.01
2013/0042015 A1   2/2013  Begen et al.
(Continued)

FOREIGN PATENT DOCUMENTS

WO    2014/158264 A1    10/2014

*Primary Examiner* — Tauqir Hussain
*Assistant Examiner* — Thao Duong
(74) *Attorney, Agent, or Firm* — Thorpe North & Western

(57) ABSTRACT

Technology for supporting dynamic adaptive streaming over hypertext transfer protocol (DASH) is disclosed. A quality metric may be determined, at a network device, for each of a plurality of media content segments in a defined representation that are described in a media presentation description (MPD) file. Media content segments may be identified in the defined representation in which the determined quality metric is below a selected threshold. The identified media content segments may be replaced with corresponding media content segments from a different representation that are described in the MPD file to form a modified MPD file, wherein the quality metric for the corresponding media content segments is greater than the selected threshold in order to provide a substantially constant quality playback of the media content segments in the defined representation.

19 Claims, 9 Drawing Sheets

(51) Int. Cl.
*H04N 21/658* (2011.01)
*H04N 21/845* (2011.01)

(56) References Cited

U.S. PATENT DOCUMENTS

| | | | |
|---|---|---|---|
| 2013/0212223 A1* | 8/2013 | Ur | H04L 65/601 709/219 |
| 2013/0290492 A1* | 10/2013 | ElArabawy | H04L 65/80 709/219 |
| 2014/0013375 A1 | 1/2014 | Giladi | |
| 2014/0019593 A1* | 1/2014 | Reznik | H04L 65/60 709/219 |
| 2014/0040498 A1 | 2/2014 | Oyman et al. | |
| 2014/0207907 A1* | 7/2014 | Wang | H04L 65/602 709/217 |
| 2014/0254689 A1* | 9/2014 | Ho | H04N 19/00066 375/240.26 |
| 2014/0304422 A1* | 10/2014 | Di | H04L 65/602 709/231 |

* cited by examiner

VIDEO QUALITY ENHANCEMENT

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
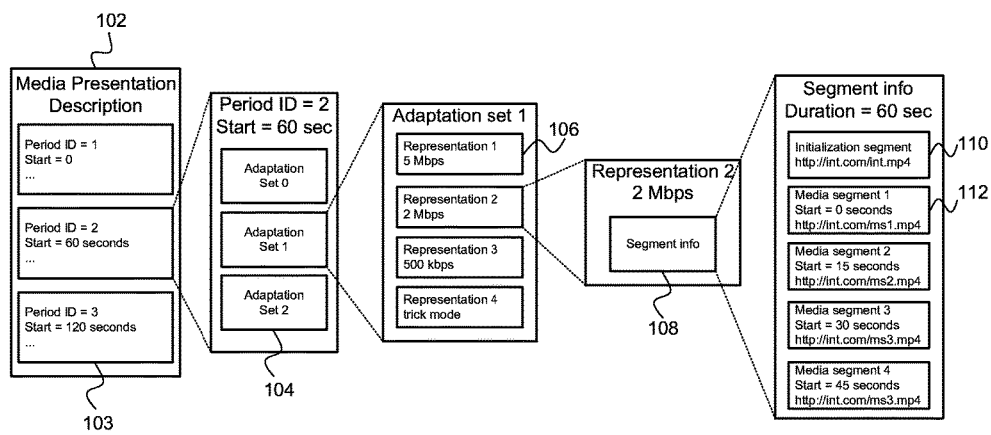
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for grouping media content segments of similar quality within a representation of media content segments in a media presentation description (MPD) file. For example, the MPD file can describe a first set of media content files in a first representation (e.g., a representation at a relatively high bit rate). In addition, the MPD file can describe a second set of media content files in a second representation (e.g., a representation at a relatively low bit rate). The representation can refer to a set of media content files at a defined quality level and/or a defined bit rate. A quality metric can be determined for each of a plurality of media content segments within the same representation (e.g., the media content segments that have the relatively low bit rate). Media content segments can be identified that have a quality metric below a selected threshold. For example, in a group of ten media content segments in the representation, one of the media content segments can be of relatively lower quality (as evidenced by the quality metric for the one media content segment being lower than the selected threshold). The media content segments in the representation having quality metrics that are below the selected threshold can be replaced with other media content segments. For example, the media content segment with the quality metric lower than the selected average can be replaced with a corresponding media content segment from a different representation. The different representation can include a set of media content files at a relatively higher bit rate. The corresponding media content segment can be from a substantially identical media time range as compared to the media content segment that is being replaced. As a result, the media content segments for the representation can all have a relatively similar quality level (although the bit rate can slightly vary between the media content segments). A modified MPD can be generated to include the media content segments having the relatively similar quality levels. The modified MPD can be communicated to a client, wherein the modified MPD can provide a substantially constant quality playback of the media contents segments at the client.

In an alternative configuration, the media content segments in the representation having a quality metric that is below the selected threshold can be re-encoded. Re-encoding the media content segments can improve the quality level, such that the quality metric for the re-encoded media content segments can be above the selected threshold. The modified MPD can be generated to include the re-encoded media content segments. As a result, the media content segments in the representation (i.e., both the media content segments that were re-encoded and the media content segments that were not re-encoded) can have relatively similar quality levels.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the start-up phase. After this, the client begins playback of the buffered multimedia content. The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput.

Multimedia streaming in a high mobility environment can be challenging when fluctuations in network conditions (i.e., network variability) decreases a communication data rate associated with the multimedia content. When an overloaded network causes the communication data rate to decrease, an end user quality of experience (QoE) can decrease as well. For example, the multimedia content received at the mobile device can be of less resolution or quality and/or the multimedia content can periodically break or pause when being provided over the overloaded network.

The use of progressive download based streaming techniques in mobile networks of limited resources can be undesirable due to inefficient bandwidth utilization and poor end user quality of experience. As discussed in further detail below, hyper-text transfer protocol (HTTP) based streaming services, such as dynamic adaptive streaming over HTTP (DASH), can be used to address weaknesses of progressive download based streaming.

Multimedia content that is streamed to a client, such as a user equipment (UE), can include a plurality of multimedia content segments. The multimedia content segments can each contain different encoded versions that represent different qualities levels of the multimedia content. The different encoded versions can allow the client to seamlessly adapt to changing network conditions. For example, when the network conditions are good (i.e., the network conditions are above a predetermined threshold), the client can request multimedia content segments that are of a higher video quality. When the network conditions are poor (i.e., the network conditions are below a predetermined threshold), the client can request multimedia content segments that are of a lower video quality. As a result, the client may still be able to receive the multimedia content segments (albeit at a lower quality) when the network conditions are poor and a likelihood of the adaptive media stream being interrupted can be reduced.

In DASH, the client can select the multimedia content segments with a highest bit rate, such that the multimedia content segments can be downloaded at the client in time for media playback without causing a rebuffering event in the media playback. In other words, the client may not select multimedia content segments that are so high that the adaptive media stream is periodically interrupted in order to cache or preload a portion of the media content onto the client before resuming media playback at the client. In one example, adverse network conditions can degrade a quality of the media content stream. The adverse network conditions can include coverage nulls, abrupt bandwidth changes, packet losses, substantial delay variations, etc. Although adaptive streaming techniques may consider current network conditions when calculating an available throughput and determining an appropriate streaming bit rate based on the available throughput, smooth media playback at the client may not be guaranteed during abrupt network variations and/or adverse network conditions.

Therefore, in order to maintain a desirable quality of experience for an adaptive media stream at the client, the client's planned route and current network conditions along the planned route can be used to strategically cache the multimedia content segments at the client, thereby resulting in smoother media playback and an enhanced quality of experience at the client. The client can select a planned route (i.e., a geographical route that the client is about to embark on). The client can be streaming media content (e.g., a movie) while traveling on the planned route. In one example, the client can include a mobile device located within a moving vehicle or a computing device of the vehicle. The client can receive current network conditions for the planned route from a channel information database (CID). The current network conditions can include certain locations along the planned route (e.g., tunnels, bridges, remote areas) with corresponding network conditions that are below a predetermined threshold. The client can request additional media content segments of the media content (e.g., additional segments of the movie) from a media content server and then store the additional media content segments in the cache. When the client reaches the locations along the planned route with network conditions that are below the predetermined threshold, the client can playback media content that is stored in the cache. As a result, continuous media playback can be substantially provided at the client, even during times when current network conditions along the planned route fall below the predetermined threshold.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards can be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
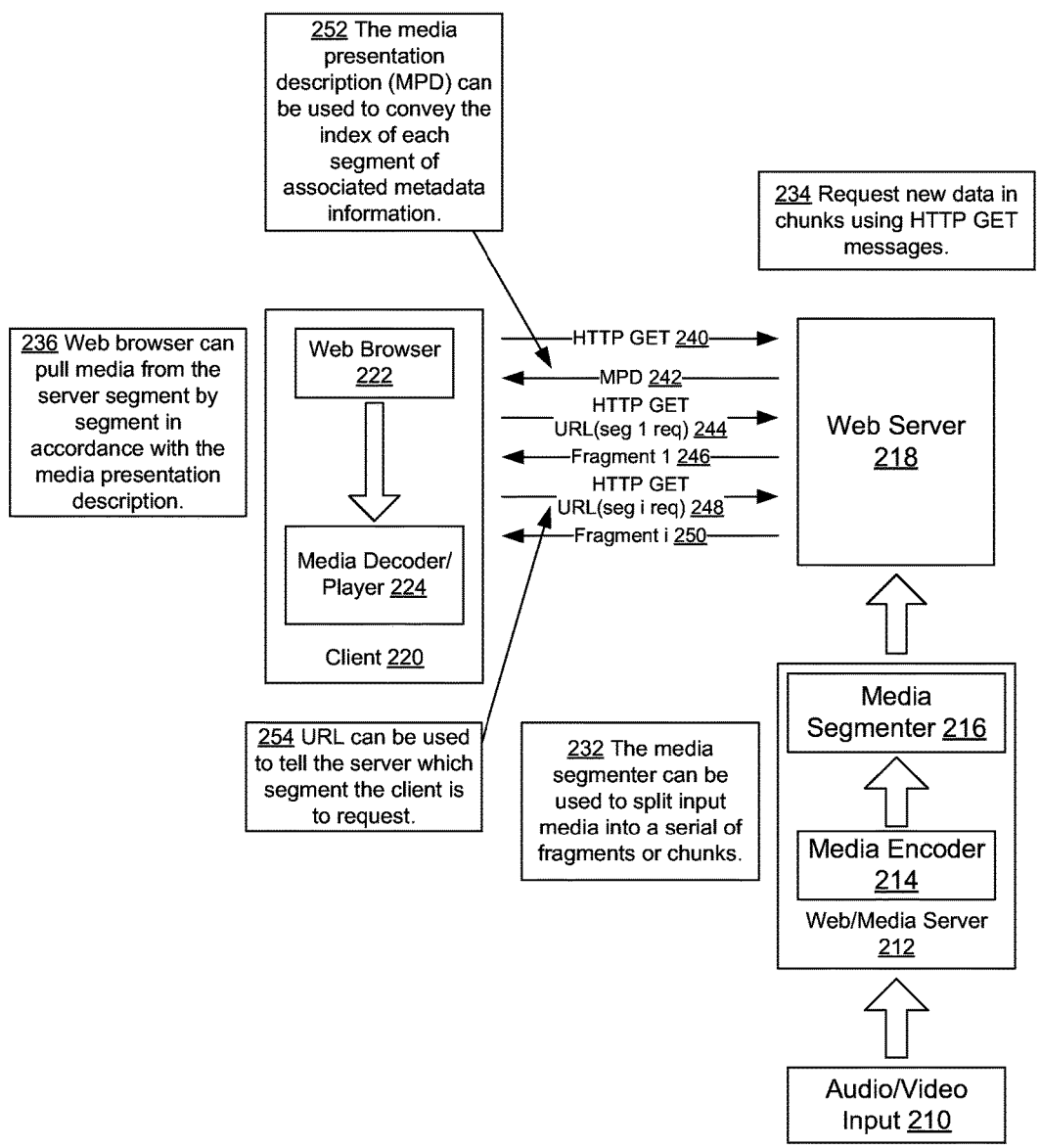
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set can also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video can also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs can be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments can have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device can only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL(frag 1 req) 244. A uniform resource locator (URL) or universal resource locator can be used to tell the web server which segments the client is to request 254. The web server can provide the first fragment (i.e., segment 1 246). For subsequent segments, the web browser can request a segment i using a HTTP GET URL(frag i req) 248, where i is an integer index of the segment. As a result, the web server can provide a segment i 250. The segments can be presented to the client via a media decoder/player 224.

Figure 3:
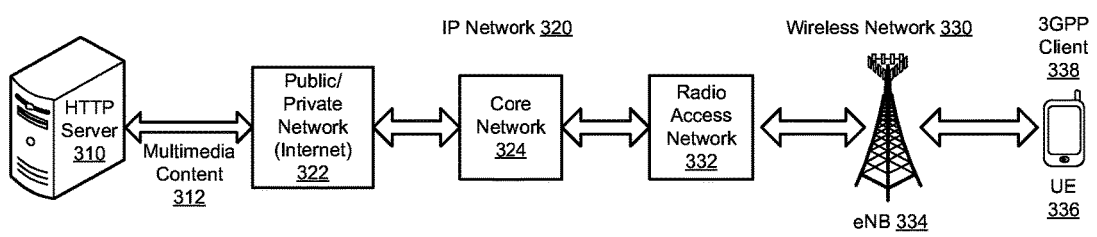
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN 332 can provide the multimedia content to the client operating on the UE 336 via a node (e.g., an evolved Node B (eNB) 334).

The HTTP server 310 can be coupled to a channel information database 350. The channel information database 350 can include current network conditions for a plurality of geographical locations. The plurality of geographical locations can include particular roads, streets, neighborhoods, geographical regions, bridges, tunnels, etc. The current network conditions can be based on real-time monitoring of the current network conditions for the plurality of geographical locations. Therefore, the channel information database 350 can be dynamically updated due to variations in the current network conditions. Alternatively, the current network conditions can be inferred based on historical network condition information for the plurality of geographical locations. In yet another example, the current network conditions can be determined using crowd sourced network condition information.

In DASH, media content can be stored at different representations (e.g., corresponding to quality levels). Each representation can include a list of media content segments that can be requested by a client (e.g., a mobile device). Information on the different representations and the list of media content segments for each representation can be compiled in the MPD and downloaded by the client, and based on the MPD, the client can request different media content segments from the server.

In one example, various post-processing operations can be performed on the DASH-formatted content and associated MPD files, i.e., manifest files, in order to handle quality variation introduced by the encoding process. Video content characteristics often change based on the nature of the content, which is one reason why encoders cannot always produce consistent quality and at the same time produce bit streams that have certain, specified bitrates. For example, rapidly changing scenes having a relatively large amount of movement, such as in sports video clips, can be difficult to encode with consistent quality and, therefore, the quality of the encoded data can fluctuate significantly. As another example, a transition between scenes can be difficult to encode without introducing some level of quality variation. On the other hand, encoding slow changing scenes can be encoded with less quality variation because a relatively lower number of bits are used to represent these scenes.

A number of commercial encoders (or video codecs) produce encoded media content segments with variable quality levels. A video code is a device or software that enables compression or decompression of digital video. Some examples of video codecs include H.265 or Motion Picture Experts Group (MPEG)-H High Efficiency Video Coding (HEVC), H.264 or MPEG-4 Advanced Video Coding (AVC), or H.263/MPEG-4 Part 2.

Figure 4:
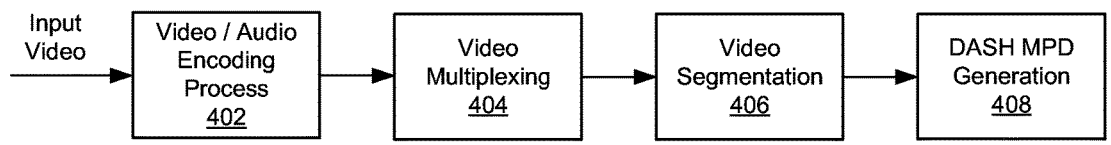
FIG. 4 is a diagram of a dynamic adaptive streaming over hyper-text transfer protocol (DASH) media presentation description (MPD) file generation process in accordance with an example.

FIG. 4 is a diagram of an exemplary dynamic adaptive streaming over hyper-text transfer protocol (DASH) media presentation description (MPD) file generation process. In some examples, the DASH MPD file generation process can occur at a server (e.g., an edge server) in a content delivery network (CDN) or an operator network. Input video can be received at the server. The input video can include media content, such as a sports match or a news broadcast. The media content received at the server can include a single file (e.g., a file of a 2-hour news event). In addition, the input video can be an original, uncompressed video signal. In block 402, a video/audio encoding process can be performed on the media content. The video encoding (or video transcoding) process can organize the media content into a digital format that is compatible with Web players and mobile devices. In other words, the media content can undergo a video encoding process to transform the media content into a format viewable on various devices. Examples of video codecs can include H.265, H.264, Windows Media Video (WMV), etc. Examples of audio codecs include MPEG-1 or MPEG-2 Audio Layer III (MP3) and Windows Media Audio (WMA). In block 404, a video multiplexing process can be performed to interleave audio content and video content with one another.

In block 406, the media content (with the interleaved video and audio) can undergo a segmentation process. In other words, the media content can be segmented into a plurality of media content segments. For example, each media content segment can be 0.5 seconds long, 1 second long, 2 seconds long, etc. In step 408, the DASH MPD can be generated that describes the media content segments. The DASH MPD file generation process can be repeated for each bitrate specified by a content provider. Thus, the MPD can contain several representations each for a given bitrate. The bitrates can be different from one representation to another (e.g., 500, 1000, 1500 kilobits/second) in order to provide adaptive media content streaming. The DASH MPD can be communicated to a client, and the client can use the DASH MPD to request certain media content segments from the server for playback at the client.

Figure 5:
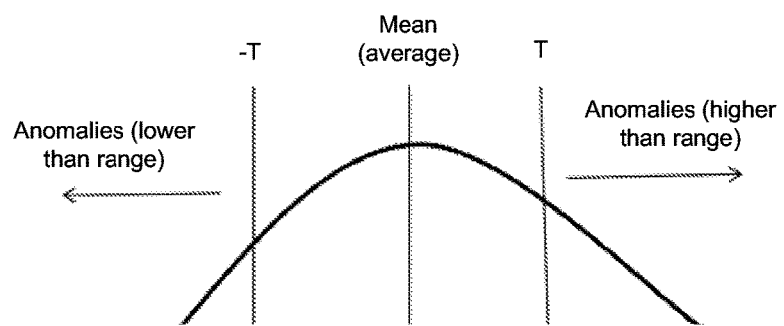
FIG. 5 illustrates quality variation among media content segments within a representation of media content segments in accordance with an example.

FIG. 5 illustrates an exemplary quality variation among media content segments within a representation of media content segments. As shown in FIG. 5, the quality level for a typical representation can generally remain constant, but can include anomalies of both higher quality and lower quality in the representation. The media content segments that result from the encoding, multiplexing and segmentation process (as described in FIG. 4) can vary in quality levels (e.g., certain media content segments can be have greater or less quality levels as compared to other media content segments) due to the nature of variable bitrate encoding, the media content that is being encoded, and the different encoding techniques employed by the video encoding process. In other words, the process of encoding an uncompressed video signal can result in the quality variation.

In one example, a fast moving scene in the video content and a slow moving scene in the video content can be encoded using the same encoding technique. However, due to the relatively large number of bits used for the fast moving scene and the relatively low number of bits used for the slow moving scene, the fast moving scene can be of lower quality than the slow moving scene, even though both scenes are in the same representation. For clients with different supported bitrates, the quality variation from one media content segment to another media content segment can be noticeable by the client. In other words, a user of the client can notice the variation in quality level between different scenes or frames, thereby potentially resulting in a poor user experience.

Figure 6:
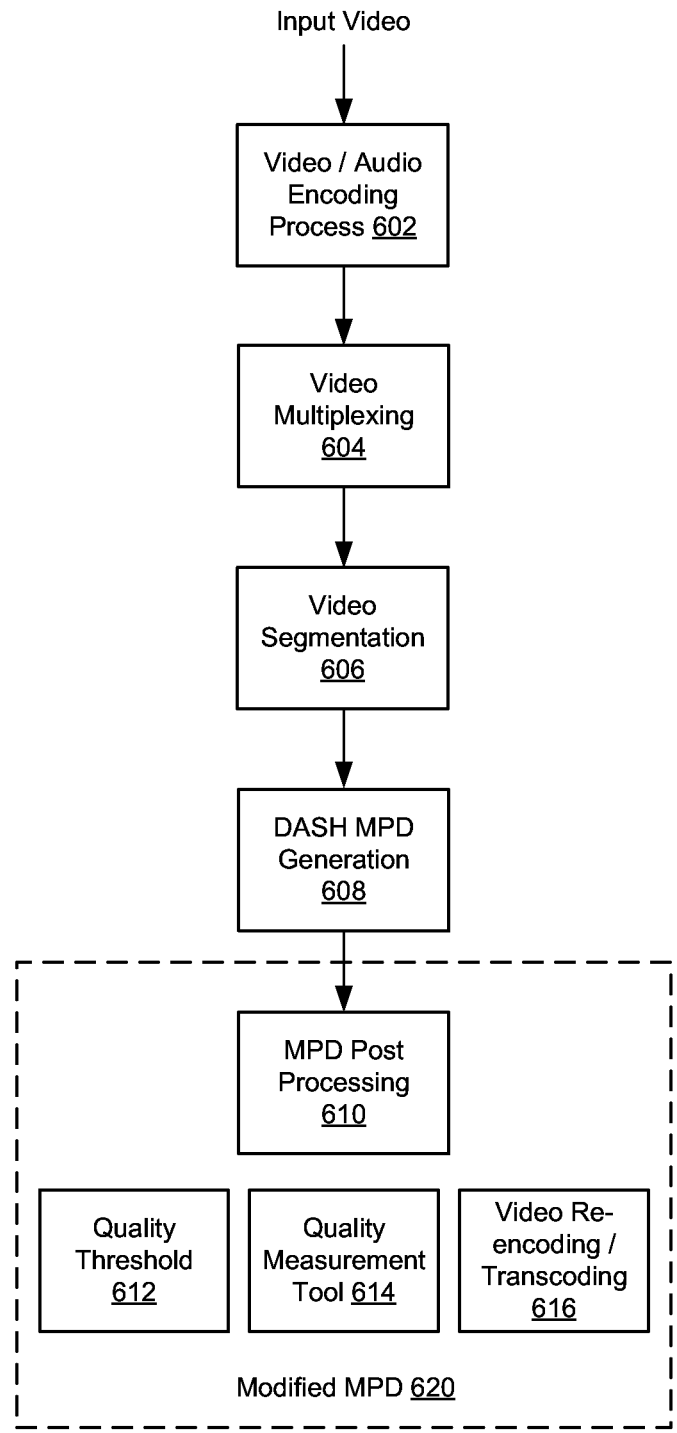
FIG. 6 is a diagram of a dynamic adaptive streaming over hyper-text transfer protocol (DASH) media presentation description (MPD) file generation process that includes an MPD post-processing technique in accordance with an example.

FIG. 6 is a diagram of an exemplary dynamic adaptive streaming over hyper-text transfer protocol (DASH) media presentation description (MPD) file generation process that includes an MPD post-processing technique. In some examples, the DASH MPD file generation process with the MPD post-processing technique can occur at a server (e.g., an edge server) in a content delivery network (CDN) or an operator network. Input video can be received at the server. The input video can include media content, such as a sports match or a news broadcast. In block 602, a video/audio encoding process can be performed on the media content. In block 604, a video multiplexing process can be performed to interleave audio content and video content with one another. In block 606, the video and audio content (or media content stream) can undergo a segmentation process. In other words, the media content stream can be segmented into a plurality of media content segments. In step 608, the DASH MPD can be generated that describes the media content segments. In step 610, the MPD post processing technique can be performed on the DASH MPD. Media content segments of similar quality within a representation can be grouped together and used to create a modified MPD 620. In one example, the MPD post processing technique can be performed at a DASH encoder and not at a video codec.

A quality metric for each media content segment in each representation can be compared, for example, using a quality measurement tool 614. The quality metric can be objective or subjective criteria used to judge a quality level of the media content segment. In general, media content quality (or video quality) refers to a formal or informal measure of perceived video degradation between original video content and the video content after its passed through a video transmission or processing system (e.g., a video encoder). In other words, the quality metric can measure a difference between an original video signal, which is generally considered to be of high quality (since the original video signal is not compressed) and the encoded (or otherwise transformed) video signal. One technique for evaluating a quality of digital video processing systems (e.g., video codecs) is to calculate a signal-to-noise ratio (SNR) and peak signal-to-noise ratio (PNSR) between the original video signal and the signal passed through the video processing system. PSNR is a commonly used objective video quality metric. Other quality metrics can include perceptual evaluation of video quality (PEVQ), structural similarity (SSIM) and Czenakowski Distance (CZD). The quality metric can be assigned to each of the media content segments, or alternatively, each media content segment can be divided into media content sub-segments, and each of the media content sub-segments can be assigned the quality metric.

The quality metric for each media content segment can be compared with the other media content segments in that same representation. If the media content segments in the representation are of substantially similar quality to the other media content segments in the representation, then the media content segments are unaffected. The media content segments can be unaffected when the quality metric for each of the media content segments exceeds a selected quality threshold 612. In some examples, the selected quality threshold 612 can be determined by the server or a user equipment (UE).

If the media content segments in the representation are below the selected quality threshold 612, these media content segments can be replaced in the representation. For example, these media content segments can be replaced with corresponding media content segments from a different representation that are described in the MPD file. In some examples, the different representation can include a set of media content files at a relatively higher bit rate or a relatively lower bit rate. The quality metric for the corresponding media content segments can be greater than the selected quality threshold 612. The corresponding media content segments can be from a substantially identical media time range in the different representation. As a result, the media content segments for the representation can be of substantially similar quality. The modified MPD 620 can be generated to include the media content segments, each having a relatively similar quality level. The modified MPD 620 can be communicated to a client, wherein the modified MPD can provide a substantially constant quality playback of the media contents segments at the client. The client can be provided representations of media content having minimal temporal variations in quality. Thus, the client can access a given representation and experience consistent quality and reduced amounts of quality fluctuations during playback.

As a non-limiting example, a 2-second media content segment may correspond to a video time code of 2:11:22 (i.e., two hours, eleven minutes, and twenty two seconds) to 2:11:24. The 2-second media content segment may be included in a 4.5 megabits per second (Mbps) video stream. A quality metric for the 2-second media content segment may be determined as being below the quality threshold 612. A corresponding media content segment from a higher representation (e.g., a 2-second media content segment having a video time code of 2:11:22 to 2:11:24 in a 5.3 Mbps video stream) can replace the 2-second media content segment with the reduced quality. Therefore, media content segments of similar quality (albeit different bitrates) can be grouped together in the representation. Media content segments can be mixed and matched in order to achieve a set of media content segments in a representation that all substantially have the same quality level.

In one example, media content segments that are grouped together can have similar quality levels, but different bitrates. For example, media content segments of a relatively higher bitrate can be mixed with media content segments of a relatively lower bitrate (even though the quality level is substantially similar). The client can operate more efficiently when the bitrates for the media content segments have less fluctuation. Thus, a minimal amount of bitrate fluctuation can be desirable for the client. On the other hand, segments with varying quality levels can be undesirable to a user of the client. Therefore, a tradeoff or compromise can be made between achieving a stable bitrate and achieving stable video quality.

In an alternative configuration, the media content segments in the representation having a quality metric that is below the selected quality threshold 612 can be re-encoded. For example, the media content segments can be re-encoded using a different encoder configuration. The media content segments can be re-encoded using video codecs (e.g., H.264) or audio codecs (e.g., MP3). Re-encoding the media content segments can improve the quality level, such that the quality metric for the re-encoded media content segments can be above the quality threshold 612. In other words, the media content segments can be re-encoded, and the quality metric for the re-encoded media content segments can be determined. If the quality metric is now above the quality threshold 612, the re-encoded media content segments can be included in the MPD. As a result, the media content segments in the representation (i.e., both the media content segments that were re-encoded and the media content segments that were not re-encoded) can have relatively similar quality levels.

In one example, the modified MPD 612 can be generated for a particular device type (or target device) since the quality threshold 612 can depend on the type of device being used by the user. For example, a high-resolution 12-inch display screen can have a greater number of pixels as compared to a 6-inch display screen, and therefore, a video that is of acceptable quality on the 6-inch display screen can be unacceptable for the 12-inch display screen. Therefore, for a given target device with known capabilities (e.g., screen size, screen resolution), the MPD post processing can be performed for that specific target device. The media content can be re-encoded at the DASH level for each device type. Media content for televisions can be encoded differently than media content for smart phones or tablet computers. In one example, a client subscribing to a premium subscription plan can be able to access media content that is encoded for that particular client.

In another example, the MD post processing can be used to create new representations of media content by using a combination of existing representations, but with a new bitrate value that is more suitable for a particular client. For example, the media content segments for a 500 Kbps representation and the media content segments for a 1000 Kbps representation (i.e., of the same media content) can be combined to create a 750 Kbps representation of the media content, without having to transcode the media content.

Figure 7:
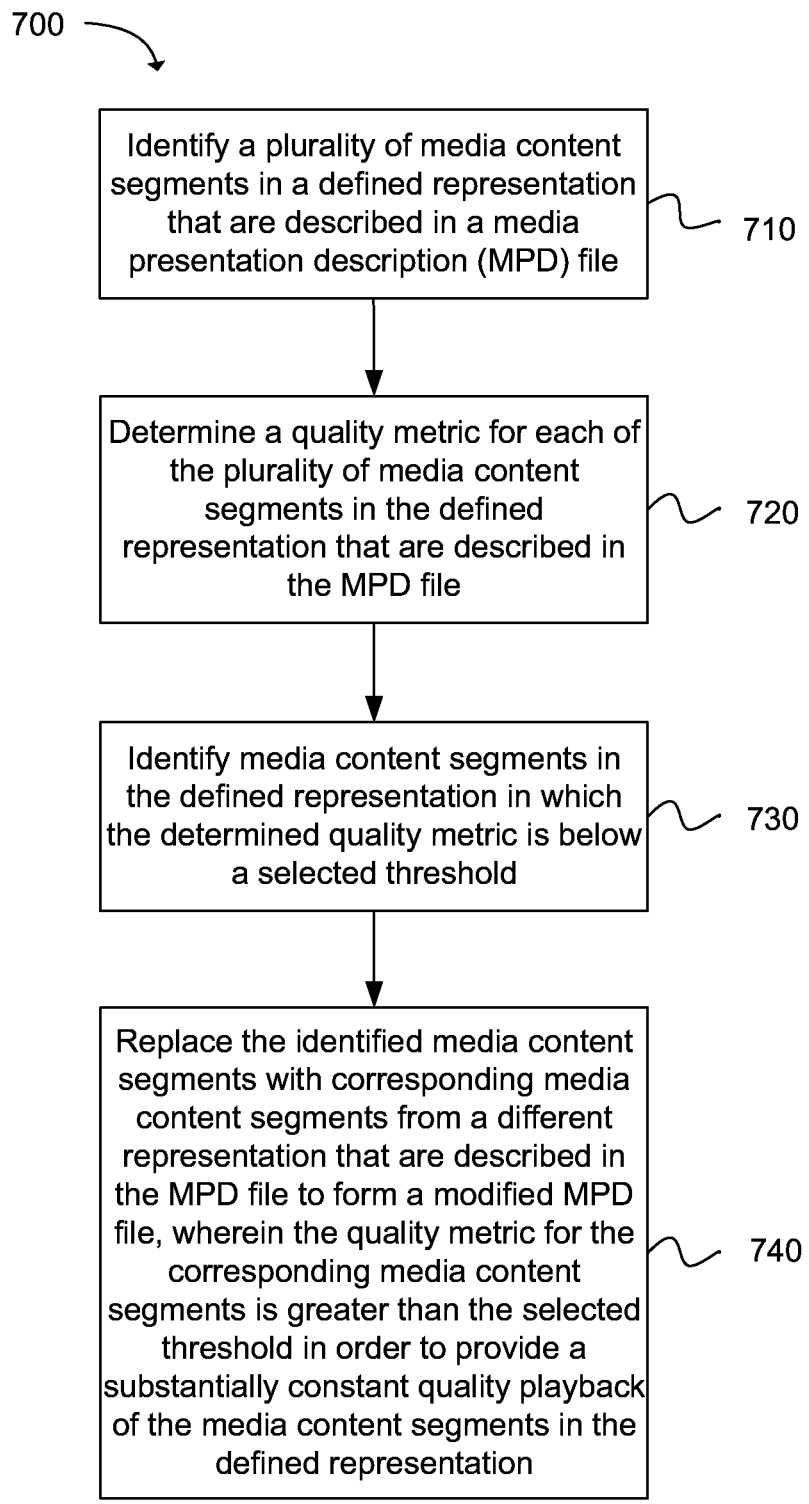
FIG. 7 depicts functionality of circuitry of a network device operable to support dynamic adaptive streaming over hypertext transfer protocol (DASH) in accordance with an example.

Another example provides functionality 700 of circuitry of a network device operable to support dynamic adaptive streaming over hypertext transfer protocol (DASH), as shown in the flow chart in FIG. 7. The functionality may be implemented as a method or the functionality may be executed as instructions on a machine, where the instructions are included on at least one computer readable medium or one non-transitory machine readable storage medium. The circuitry can be configured to identify a plurality of media content segments in a defined representation that are described in a media presentation description (MPD) file, as in block 710. The circuitry can be configured to determine a quality metric for each of the plurality of media content segments in the defined representation that are described in the MPD file, as in block 720. The circuitry can be configured to identify media content segments in the defined representation in which the determined quality metric is below a selected threshold, as in block 730. In addition, the circuitry can be configured to replace the identified media content segments with corresponding media content segments from a different representation that are described in the MPD file to form a modified MPD file, wherein the quality metric for the corresponding media content segments is greater than the selected threshold in order to provide a substantially constant quality playback of the media content segments in the defined representation, as in block 740.

In one example, the circuitry can be further configured to communicate the modified MPD file to a client device that supports DASH. In another example, the circuitry can be further configured to generate the modified MPD for a particular device type. In yet another example, the network device is located in a content delivery network (CDN) or an operator network.

In one aspect, the circuitry can be further configured to identify the quality metric for the media content segments using at least one of a bitrate parameter or a quality parameter. In another aspect, the corresponding media content segments are from a substantially identical media time range in the different representation as compared to the media content segments in the defined representation. In yet another aspect, the circuitry can be further configured to re-encode the media content segments in the defined representation in which the determined quality metric is below the selected threshold so that the determined quality metric for the re-encoded media content segments is above the selected threshold.

Figure 8:
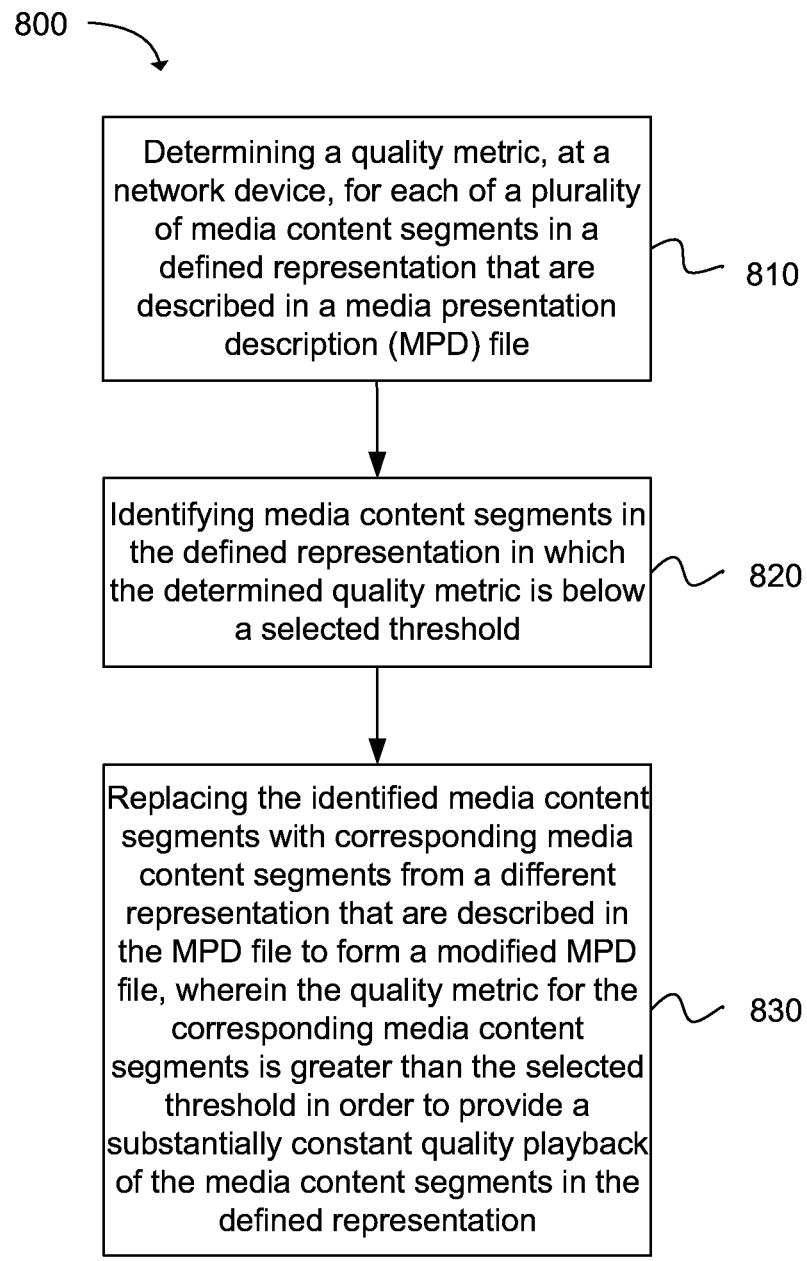
FIG. 8 depicts a flow chart of a method for supporting dynamic adaptive streaming over hypertext transfer protocol (DASH) in accordance with an example.

Another example provides a method 800 for supporting dynamic adaptive streaming over hypertext transfer protocol (DASH), as shown in the flow chart in FIG. 8. The method may be executed as instructions on a machine, where the instructions are included on at least one computer readable medium or one non-transitory machine readable storage medium. The method can include the operation of determining a quality metric, at a network device, for each of a plurality of media content segments in a defined representation that are described in a media presentation description (MPD) file, as in block 810. The method can include the operation of identifying media content segments in the defined representation in which the determined quality metric is below a selected threshold, as in block 820. The method can include the operation of replacing the identified media content segments with corresponding media content segments from a different representation that are described in the MPD file to form a modified MPD file, wherein the quality metric for the corresponding media content segments is greater than the selected threshold in order to provide a substantially constant quality playback of the media content segments in the defined representation, as in block 830.

In one example, the method can include the operation of communicating the modified MPD file from the network device to a client device that supports DASH. In another example, the method can include the operation of receiving the selected threshold for the quality metric at the network device from a user equipment (UE). In yet another example, the method can include the operation of generating the modified MPD for a particular device type.

In one configuration, the network device is located in a content delivery network (CDN) or an operator network. In another configuration, the method further comprises identifying the quality metric for the media content segments using at least one of a bitrate parameter or a quality parameter. In yet another configuration, the corresponding media content segments are from a substantially identical media time range in the different representation as compared to the media content segments in the defined representation. In addition, the method can include the operation of re-encoding the media content segments in the defined representation in which the determined quality metric is below the selected threshold so that the determined quality metric for the re-encoded media content segments is above the selected threshold.

Figure 9:
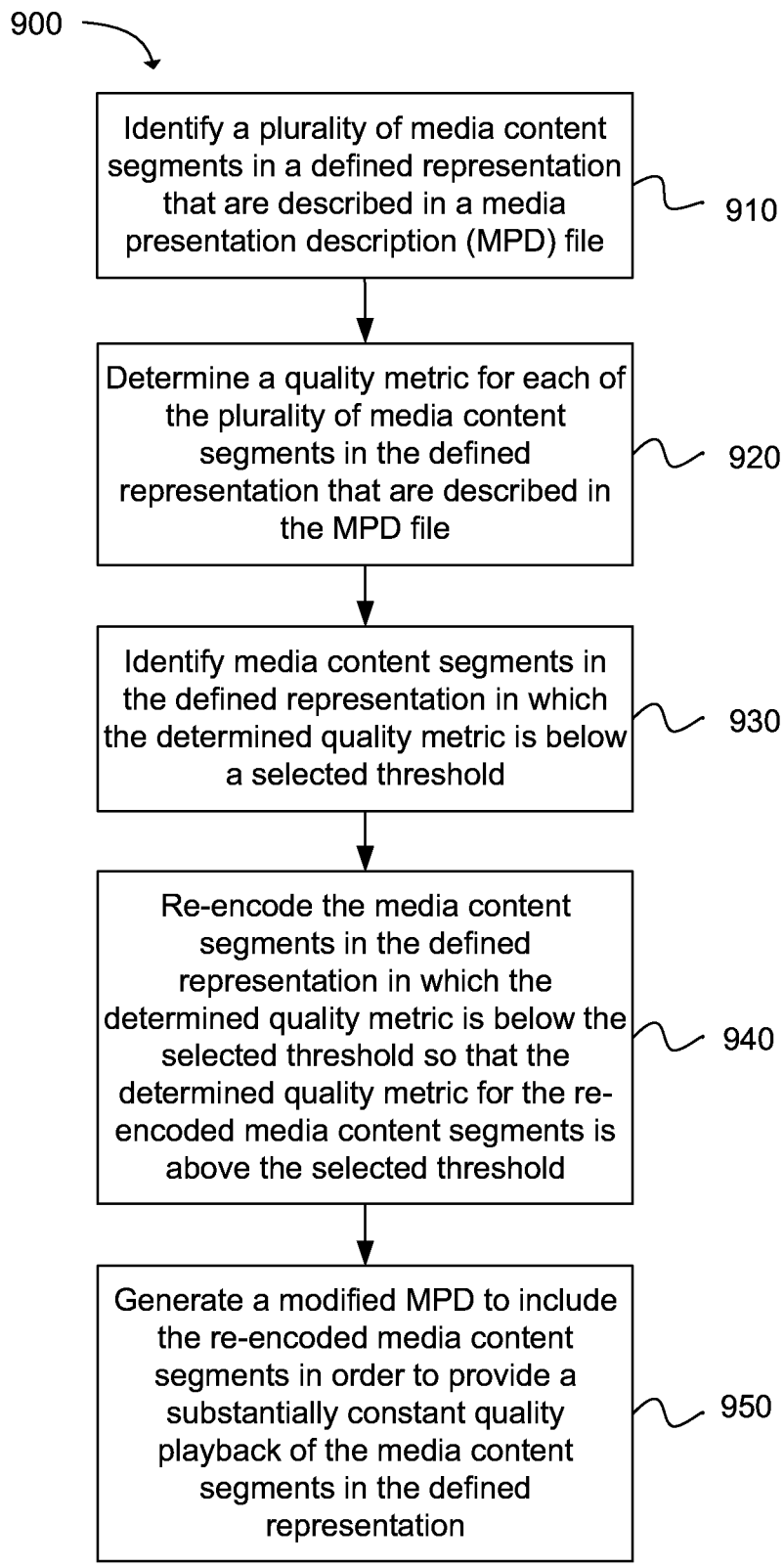
FIG. 9 depicts functionality of circuitry of a network device operable to support dynamic adaptive streaming over hypertext transfer protocol (DASH) in accordance with an example.

Another example provides functionality 900 of circuitry of a network device operable to support dynamic adaptive streaming over hypertext transfer protocol (DASH), as shown in the flow chart in FIG. 9. The functionality may be implemented as a method or the functionality may be executed as instructions on a machine, where the instructions are included on at least one computer readable medium or one non-transitory machine readable storage medium. The circuitry can be configured to identify a plurality of media content segments in a defined representation that are described in a media presentation description (MPD) file, as in block 910. The circuitry can be configured to determine a quality metric for each of the plurality of media content segments in the defined representation that are described in the MPD file, as in block 920. The circuitry can be configured to identify media content segments in the defined representation in which the determined quality metric is below a selected threshold, as in block 930. The circuitry can be further configured to re-encode the media content segments in the defined representation in which the determined quality metric is below the selected threshold so that the determined quality metric for the re-encoded media content segments is above the selected threshold, as in block 940. In addition, the circuitry can be further configured to generate a modified MPD to include the re-encoded media content segments in order to provide a substantially constant quality playback of the media content segments in the defined representation, as in block 950.

In one example, the circuitry can be further configured to communicate the modified MPD file to a client device that supports DASH. In another example, the circuitry can be further configured to generate the modified MPD for a particular device type. In yet another example, the network device is located in a content delivery network (CDN) or an operator network.

In one aspect, the circuitry can be further configured to identify the quality metric for the media content segments using at least one of a bitrate parameter or a quality parameter. In another aspect, the circuitry can be further configured to replace the identified media content segments with corresponding media content segments from a different representation that are described in the MPD file to form the modified MPD file, wherein the quality metric for the corresponding media content segments is greater than the selected threshold. In yet another aspect, the corresponding media content segments are from a substantially identical media time range in the different representation as compared to the media content segments in the defined representation.

Figure 10:
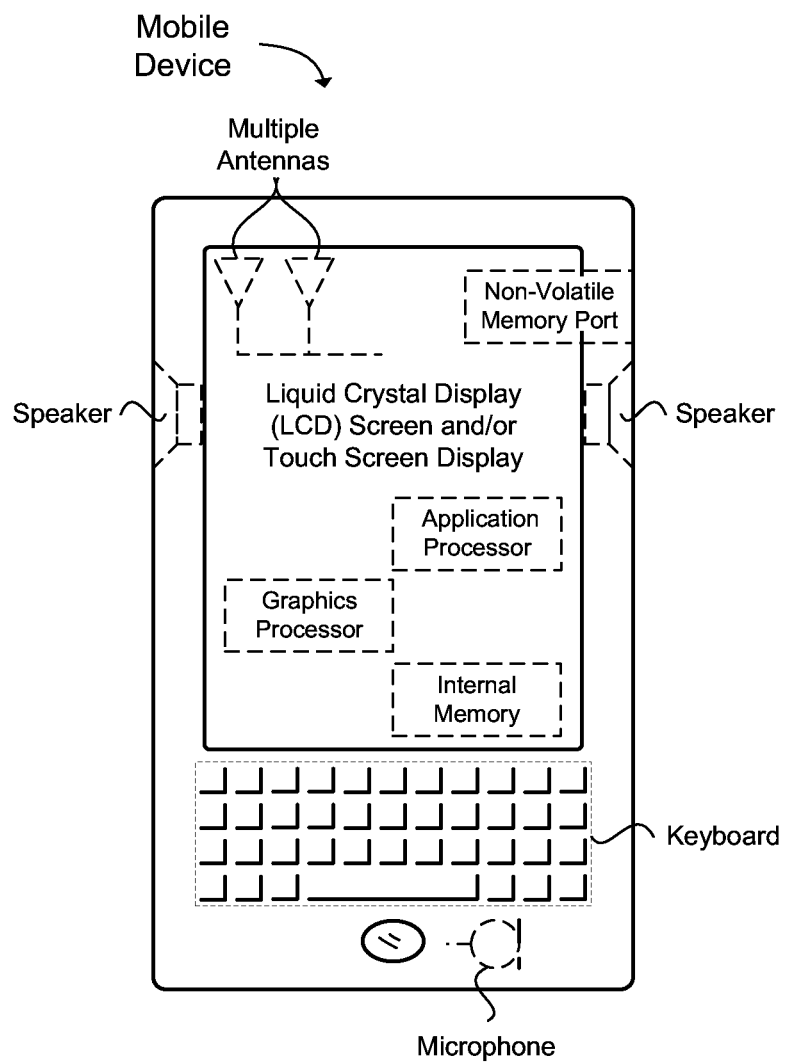
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A network device operable to support dynamic adaptive streaming over hypertext transfer protocol (DASH), the network device having circuitry configured to:
    identify a plurality of media content segments in a defined representation that are described in a media presentation description (MPD) file;
    determine a quality metric for each of the plurality of media content segments in the defined representation that are described in the MPD file, wherein the quality metric includes one or more of: a signal-to-noise ratio (SNR), or a peak signal-to-noise ratio (PSNR), or perceptual evaluation of video quality (PEVQ), or structural similarity (SSIM), or Czenakowski Distance (CZD);
    identify media content segments in the defined representation in which the determined quality metric is below a selected threshold;
    replace the identified media content segments with corresponding media content segments from a different representation that are described in the MPD file to form a modified MPD file, wherein the quality metric for the corresponding media content segments is greater than the selected threshold to provide a constant quality playback of the media content segments in the defined representation; and
    re-encode the media content segments in the defined representation in which the determined quality metric is below the selected threshold so that the determined quality metric for the re-encoded media content segments is above the selected threshold to provide a constant quality playback of the media content segments in the defined representation.

2. The circuitry of claim 1, further configured to communicate the modified MPD file to a client device that supports DASH.

3. The circuitry of claim 1, further configured to generate the modified MPD for a particular device type.

4. The circuitry of claim 1, wherein the network device is located in a content delivery network (CDN) or an operator network.

5. The circuitry of claim 1, further configured to identify the quality metric for the media content segments using at least one of a bitrate parameter or a quality parameter.

6. The circuitry of claim 1, wherein the corresponding media content segments are from a substantially identical media time range in the different representation as compared to the media content segments in the defined representation.

7. A method for supporting dynamic adaptive streaming over hypertext transfer protocol (DASH), the method comprising:
    determining a quality metric, at a network device, for each of a plurality of media content segments in a defined representation that are described in a media presentation description (MPD) file, wherein the quality metric includes one or more of: a signal-to-noise ratio (SNR), or a peak signal-to-noise ratio (PSNR), or perceptual evaluation of video quality (PEVQ), or structural similarity (SSIM), or Czenakowski Distance (CZD);
    identifying media content segments in the defined representation in which the determined quality metric is below a selected threshold;
    replacing the identified media content segments with corresponding media content segments from a different representation that are described in the MPD file to form a modified MPD file, wherein the quality metric for the corresponding media content segments is greater than the selected threshold to provide a constant quality playback of the media content segments in the defined representation; and
    re-encoding the media content segments in the defined representation in which the determined quality metric is below the selected threshold so that the determined quality metric for the re-encoded media content segments is above the selected threshold to provide a constant quality playback of the media content segments in the defined representation.

8. The method of claim 7, further comprising communicating the modified MPD file from the network device to a client device that supports DASH.

9. The method of claim 7, further comprising receiving the selected threshold for the quality metric at the network device from a user equipment (UE).

10. The method of claim 7, further comprising generating the modified MPD for a particular device type.

11. The method of claim 7, wherein the network device is located in a content delivery network (CDN) or an operator network.

12. The method of claim 7, further comprising identifying the quality metric for the media content segments using at least one of a bitrate parameter or a quality parameter.

13. The method of claim 7, wherein the corresponding media content segments are from a substantially identical media time range in the different representation as compared to the media content segments in the defined representation.

14. A network device operable to support dynamic adaptive streaming over hypertext transfer protocol (DASH), the network device having circuitry configured to:
    identify a plurality of media content segments in a defined representation that are described in a media presentation description (MPD) file;
    determine a quality metric for each of the plurality of media content segments in the defined representation that are described in the MPD file, wherein the quality metric includes one or more of: a signal-to-noise ratio (SNR), or a peak signal-to-noise ratio (PSNR), or perceptual evaluation of video quality (PEVQ), or structural similarity (SSIM), or Czenakowski Distance (CZD);
    identify media content segments in the defined representation in which the determined quality metric is below a selected threshold;
    re-encode the media content segments in the defined representation in which the determined quality metric is below the selected threshold so that the determined quality metric for the re-encoded media content segments is above the selected threshold;
    generate a modified MPD to include the re-encoded media content segments to provide a constant quality playback of the media content segments in the defined representation; and
    replace the identified media content segments with corresponding media content segments from a different representation that are described in the MPD file to form the modified MPD file, wherein the quality metric for the corresponding media content segments is greater than the selected threshold to provide a constant quality playback of the media content segments in the defined representation.

15. The circuitry of claim 14, further configured to communicate the modified MPD file to a client device that supports DASH.

16. The circuitry of claim 14, further configured to generate the modified MPD for a particular device type.

17. The circuitry of claim 14, wherein the network device is located in a content delivery network (CDN) or an operator network.

18. The circuitry of claim 14, further configured to identify the quality metric for the media content segments using at least one of a bitrate parameter or a quality parameter.

19. The circuitry of claim 14, wherein the corresponding media content segments are from a substantially identical media time range in the different representation as compared to the media content segments in the defined representation.

* * * * *